United States Patent
Andersson

(10) Patent No.: US 8,646,599 B2
(45) Date of Patent: Feb. 11, 2014

(54) TRANSPORT SAFETY DEVICE FOR A NAIL ROLL

(75) Inventor: Marie Andersson, Mullsjö (SE)

(73) Assignee: Isaberg Rapid AB, Hestra (SE)

( * ) Notice: Subject to any disclaimer, the term of this patent is extended or adjusted under 35 U.S.C. 154(b) by 0 days.

(21) Appl. No.: 13/696,061

(22) PCT Filed: Apr. 19, 2011

(86) PCT No.: PCT/SE2011/000071
§ 371 (c)(1),
(2), (4) Date: Nov. 2, 2012

(87) PCT Pub. No.: WO2011/139196
PCT Pub. Date: Nov. 10, 2011

(65) Prior Publication Data
US 2013/0048521 A1 Feb. 28, 2013

(30) Foreign Application Priority Data
May 3, 2010 (SE) ...................................... 1050435

(51) Int. Cl.
*B65D 85/24* (2006.01)
(52) U.S. Cl.
USPC .......................................... 206/346; 206/343
(58) Field of Classification Search
USPC ............................ 206/338–347; 411/442–443
See application file for complete search history.

(56) References Cited

U.S. PATENT DOCUMENTS

| | | | | |
|---|---|---|---|---|
| 3,338,396 A | * | 8/1967 | Powers | 206/347 |
| 3,438,487 A | * | 4/1969 | Obergfell et al. | 206/347 |
| 3,538,673 A | * | 11/1970 | Mosetich et al. | 206/347 |
| 3,587,842 A | | 6/1971 | Keck et al. | |
| 3,846,900 A | * | 11/1974 | Weglage | 206/343 |
| 3,854,648 A | | 12/1974 | Inzoli et al. | |
| 3,875,648 A | | 4/1975 | Bone | |
| 3,944,067 A | | 3/1976 | Bakoledis | |
| 4,037,771 A | * | 7/1977 | Peterson | 206/346 |
| 4,712,676 A | * | 12/1987 | Randall | 206/338 |
| 4,804,088 A | * | 2/1989 | MacDonald | 206/346 |
| 6,557,703 B1 | * | 5/2003 | Leitner | 206/338 |
| 8,047,366 B2 | * | 11/2011 | Nakagawa et al. | 206/343 |
| 2006/0261128 A1 | | 11/2006 | Wen | |
| 2007/0197303 A1 | | 8/2007 | Ollis | |

FOREIGN PATENT DOCUMENTS

| | | |
|---|---|---|
| GB | 170304 A | 6/1922 |
| GB | 701021 A | 12/1953 |
| GB | 1 330 336 A | 9/1973 |

* cited by examiner

Primary Examiner — Luan K Bui
(74) Attorney, Agent, or Firm — Miles & Stockbridge P.C.

(57) ABSTRACT

A transport safety device (8) for a nail coil or roll (7), the roll consisting of nails (1), comprising head (2) and shank (3), which, by connecting means (5), are connected to one another longitudinal side (4) by longitudinal side, with the heads oriented in one and the same direction, so as to form an elongate band (6) rolled up into roll form, in which form the heads in one winding turn partly cover the heads in the immediately external turn, intended to be fitted to a nail driver tool (20), where the transport safety device displays a ring (9) which surrounds the outermost turn of the nail roll in the region below the nail heads (2), in which the surrounding ring (9) consists of a configurationally stable material which displays means (10) which extend in towards the center (11) of the roll closely adjacent the upper side (12) of the nail heads.

6 Claims, 9 Drawing Sheets

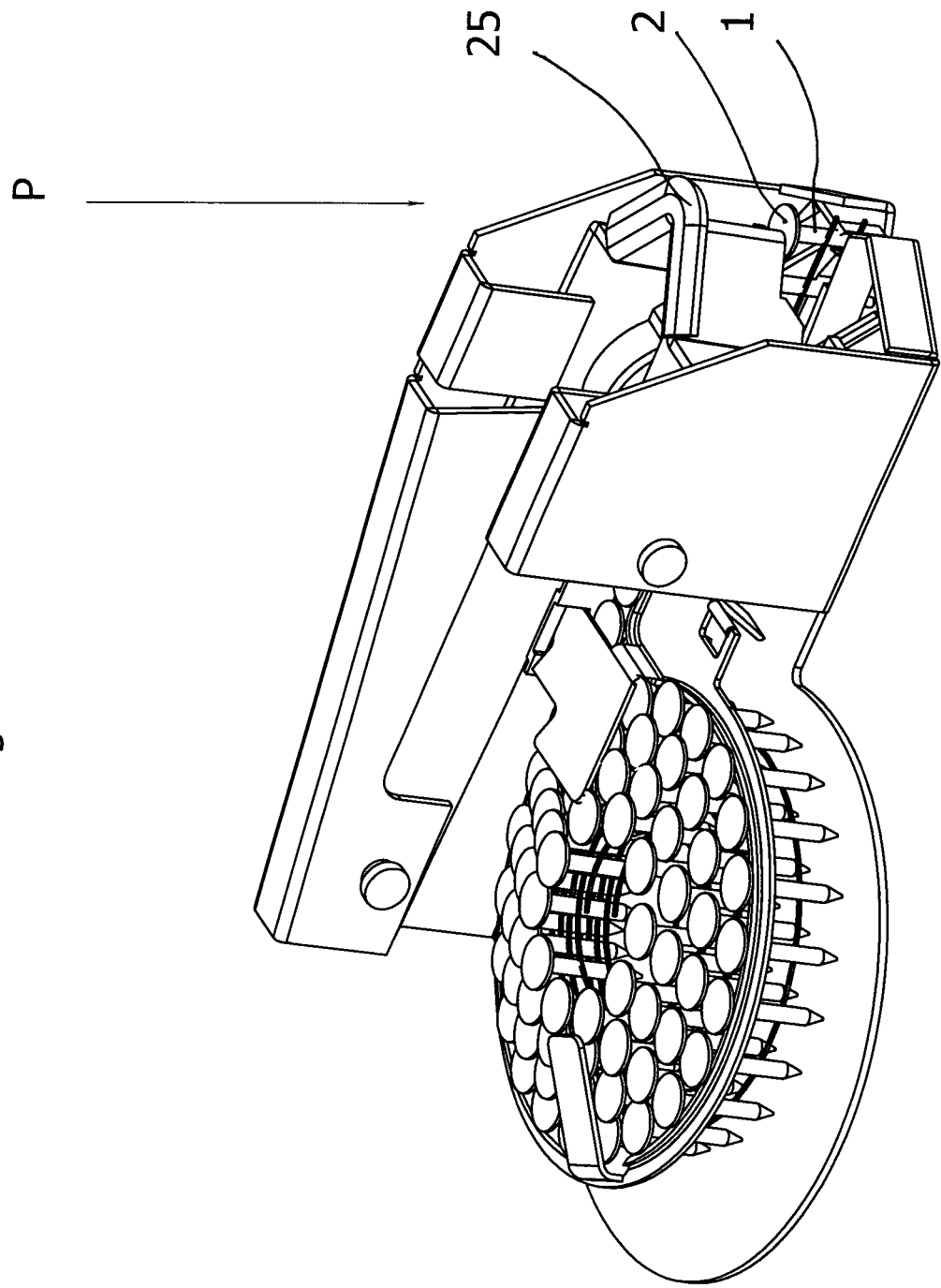

TRANSPORT SAFETY DEVICE FOR A NAIL ROLL

TECHNICAL FIELD

The present invention relates to a transport safety device for a nail coil or roll, the roll consisting of nails comprising head and shank, which, by connecting means, are connected to one another along their longitudinal sides, with the heads oriented in one and the same direction, so as to form an elongate band rolled up into roll form, in which form the heads, in one winding turn, partly cover the heads in the immediately external turn, intended to be fitted to a nail driver, the transport safety device displaying a ring which surrounds the outermost turn of the nail roll in the region below the heads of the nails.

BACKGROUND ART

Transport safety devices of the above-outlined type are common occurrences. Normally, they consist of an elastic band which is tightened around the nail coil or roll. The drawback inherent in these bands is however that they do not hold together the roll in a direction which is transverse of the plane of extent of the roll for which reason the roll readily falls apart and unrolls. This entails that the band must be rerolled into roll form before it can be fitted to the driver tool. This rerolling is time consuming and it is quite easy that the rerolling will be performed incorrectly or will fail completely, which may entail that the roll cannot be fitted correctly or, in the worst case scenario, must be scrapped. A further drawback is that prior art rolls lack devices which guide the nail when this is discharged from the roll to the area from which it is driven by the driver tool. Moreover, there is no reverse lock which prevents nails which have been discharged from the roll from re-entering the roll and thus preventing the discharge operation. Devices which guide the nail when it is discharged to an area in which it is driven by the driver tool are extremely important, since an incorrect position of the nail in this area entails that the nail is not driven in a correct manner. As regards reverse locks, these are a necessary part which must be in position to ensure that there is always a nail advanced to the driving area. When such devices are not in place in the transport safety device or otherwise in the nail roll, this implies that such devices must be placed in the driver tool in order for a correctly oriented nail to be advanced from the roll or prevented from returning to the roll once it has been discharged. The drawback inherent in having these last-mentioned devices positioned in the nail driver tool is that they consist of several parts which all require time-consuming manufacture and assembly. In addition, they must be so tolerant that they do not prevent mounting of a nail roll which has a deviating outer configuration. This often occurs since the nail roll is most generally not configurationally stable. Moreover, the fitting of the roll to the nail driver tool is time-consuming since it must be guided by hand so as to fit in its position, which may be extremely time-consuming. This work will be particularly time-consuming when fitting is carried out on site in extreme cold conditions, such as outdoors during a winter season, and as a result the user's hands are cold or the user wears gloves. If fitting takes place when the user is standing in an elevated position on a ladder, such fitting may moreover be extremely hazardous.

OBJECTS OF THE INVENTION

The device according to the present invention has for its object to realise a transport safety device which prevents the nail roll from falling apart, which displays means which replace discharge devices included in the driver tool which display a reverse locking arrangement and which moreover is simple to fit to the driver tool.

SOLUTION

The present invention realises a transport safety device which displays the disclosed properties with a transport safety device of the type disclosed by way of introduction which is characterised in that the surrounding ring consists of a configurationally stable material which displays means extending in towards the centre of the roll closely adjacent the upper side of the nail heads.

Further, the present invention is characterised in that said means comprise one or more rods placed along the ring with interjacent spacing between them.

Yet further, the present invention is characterised in that it displays a discharge device in connection with the surrounding ring through which the nail band is fed out from the nail roll.

In addition, the present invention is characterised in that the discharge device comprises a first and a second elongate rail which between them form a discharge channel.

Finally, the present invention is also characterised in that the discharge device includes a reverse lock which prevents the nail band from moving in a direction opposite the advancement direction.

BRIEF DESCRIPTION OF THE ACCOMPANYING DRAWINGS

The present invention will now be described in greater detail hereinbelow, with particular reference to the accompanying Drawings. In the accompanying Drawings:

FIGS. 8-9 are views which schematically illustrate the fitting of a nail roll provided with a transport safety device according to the present invention to a driver tool.

DESCRIPTION OF PREFERRED EMBODIMENT

Figure 1:
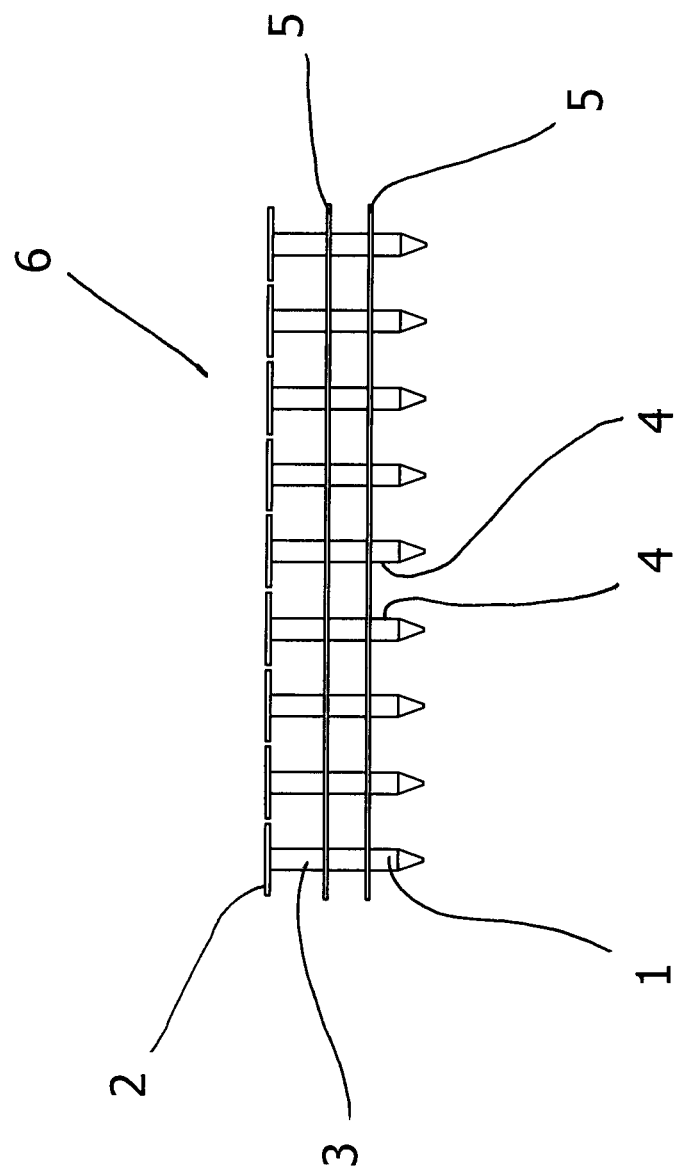
FIG. 1 is a view showing an elongate band formed from nails connected to one another by connecting means.
Figure 2:
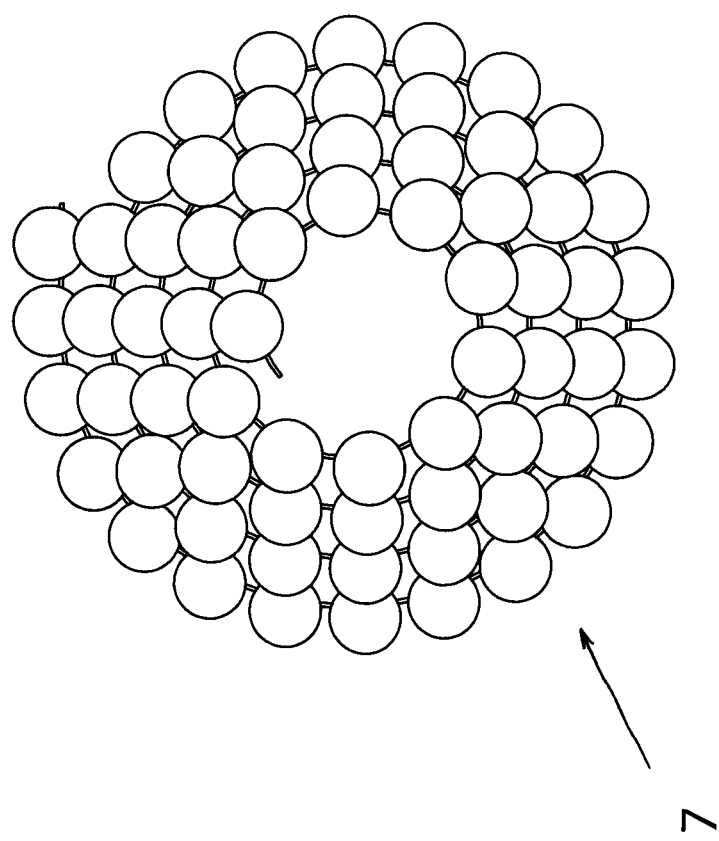
FIG. 2 is a view showing the band illustrated in FIG. 1 rolled up to form a roll.
Figure 3:
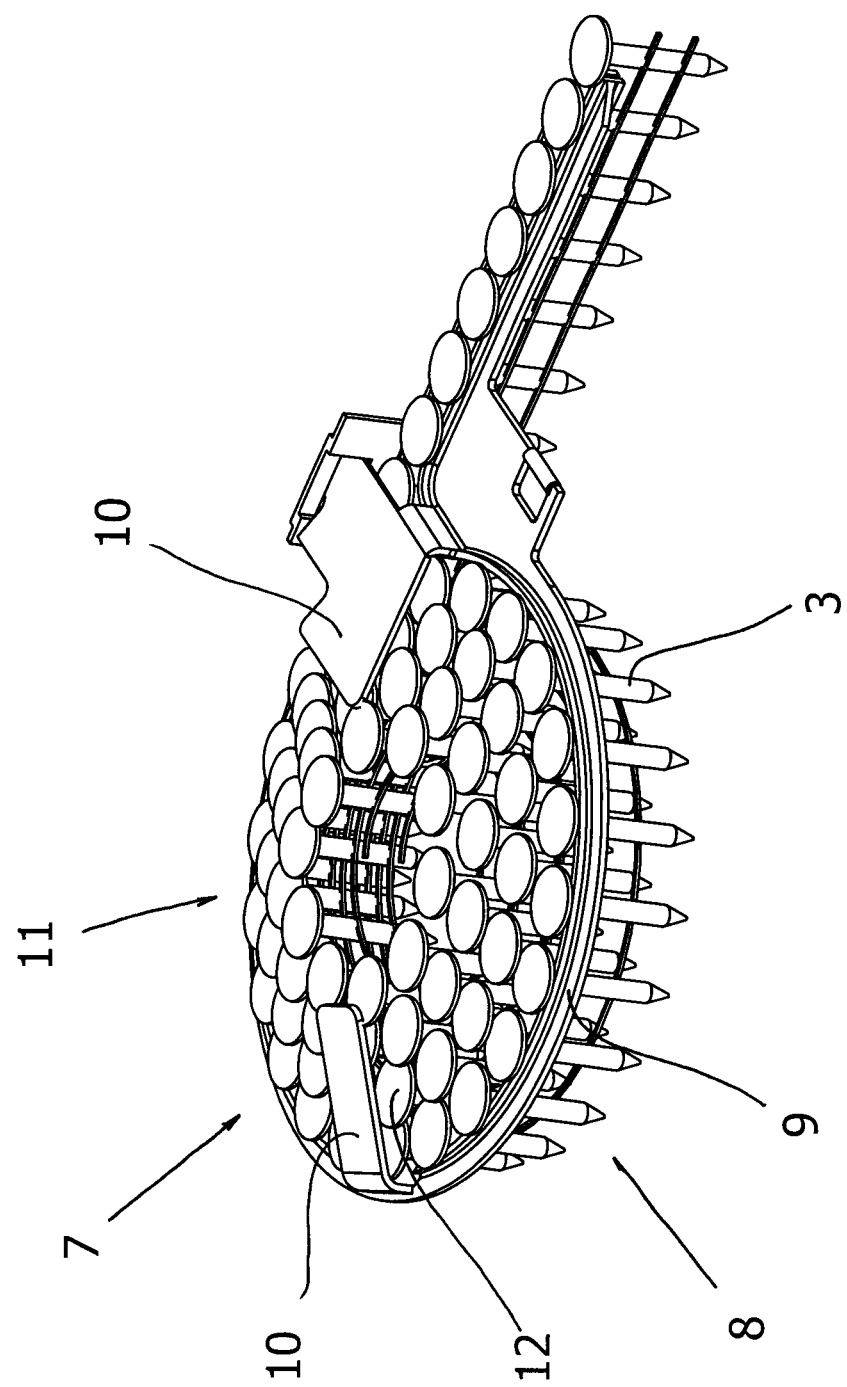
FIG. 3 is a view obliquely from above showing the roll illustrated in FIG. 2 provided with a transport safety device according to the present invention.

FIG. 1 shows nails 1 which comprise a head 2 and shank 3. The nails are oriented with the heads in one and the same direction, and the nails are placed with their longitudinal sides 4 along one another, longitudinal side by longitudinal side. By connecting means 5, the nails are connected to one another so as to form an elongate band 6. In FIG. 2, the band 6 has been rolled up to form a nail roll 7. As will readily be perceived by a person skilled in the art, the nail roll illustrated in FIG. 2 is not configurationally stable, for which reason it is necessary that it be provided with a transport safety device in order to maintain its configuration.

Figure 4:
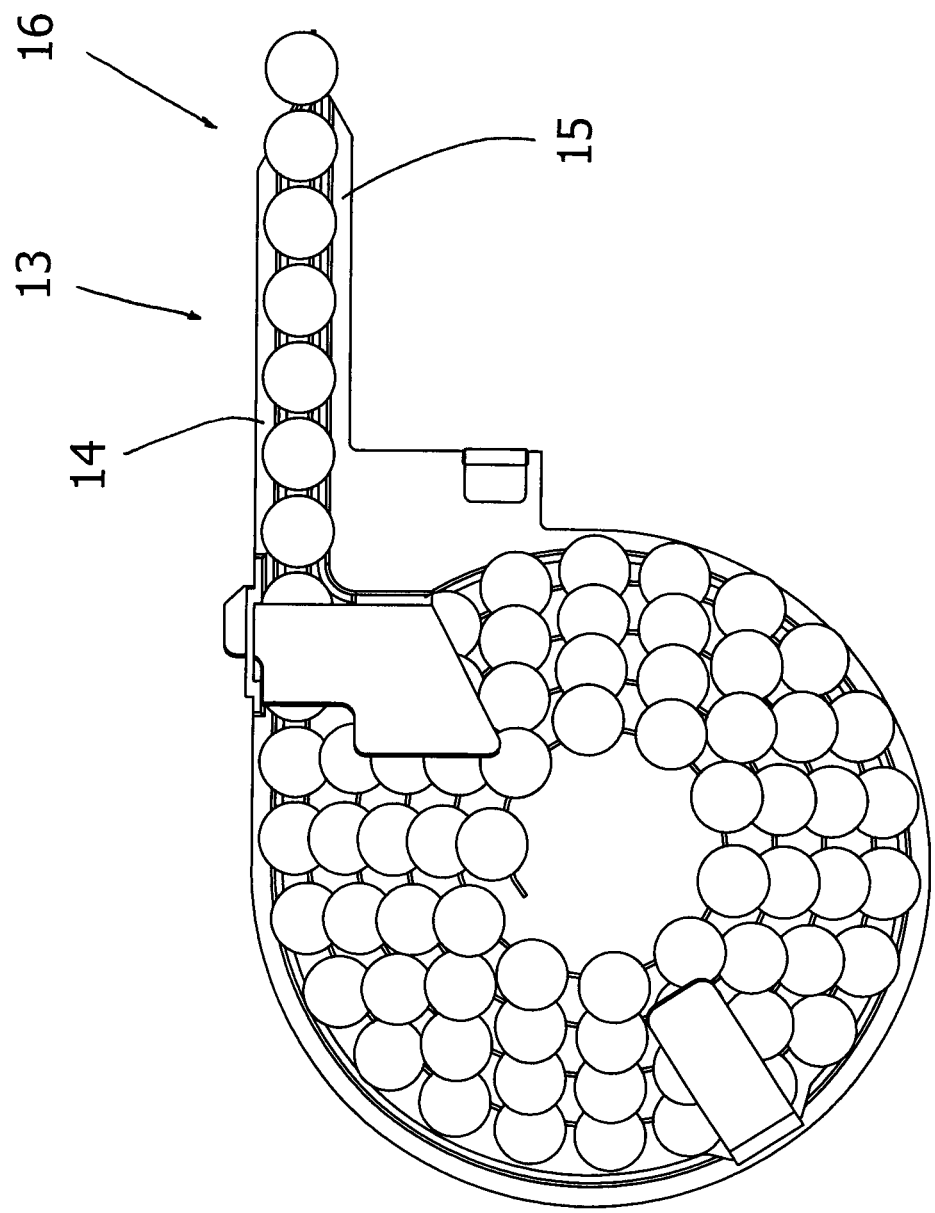
FIG. 4 is a top plan view of the roll illustrated in FIG. 3.
Figure 5:
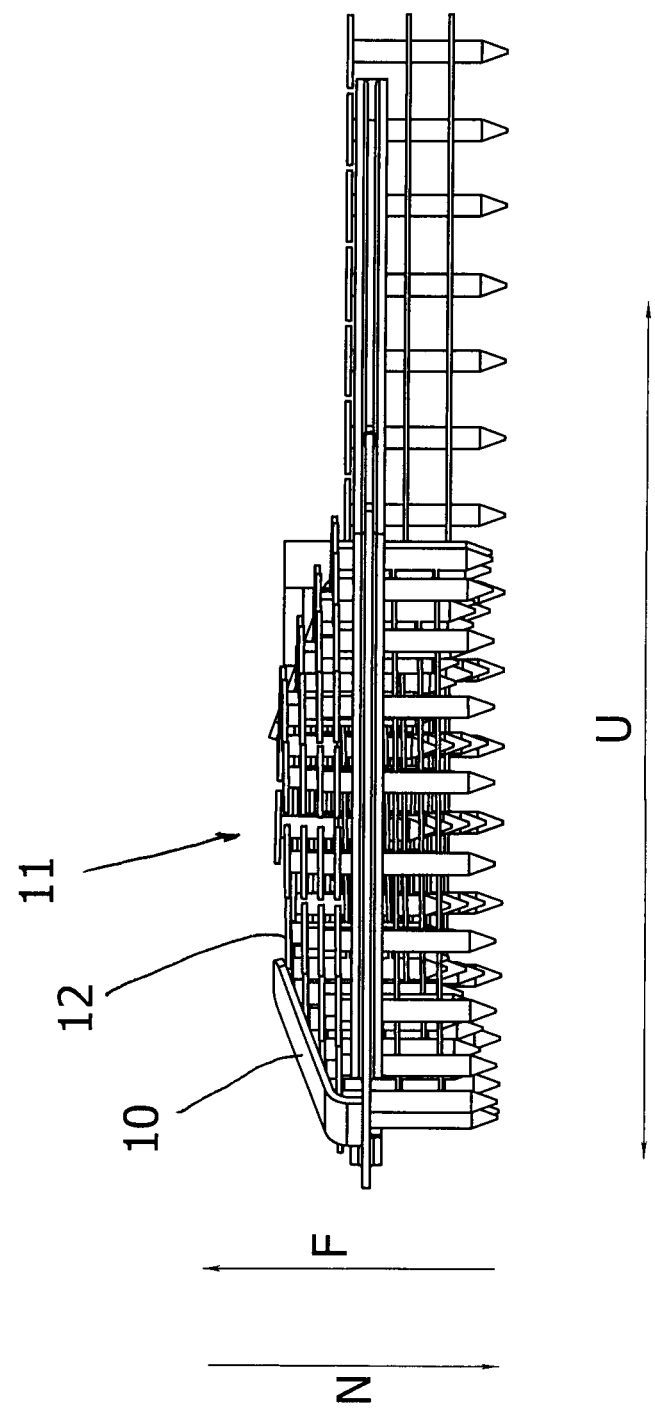
FIG. 5 is a side elevation of the roll illustrated in FIG. 3.
Figure 6:
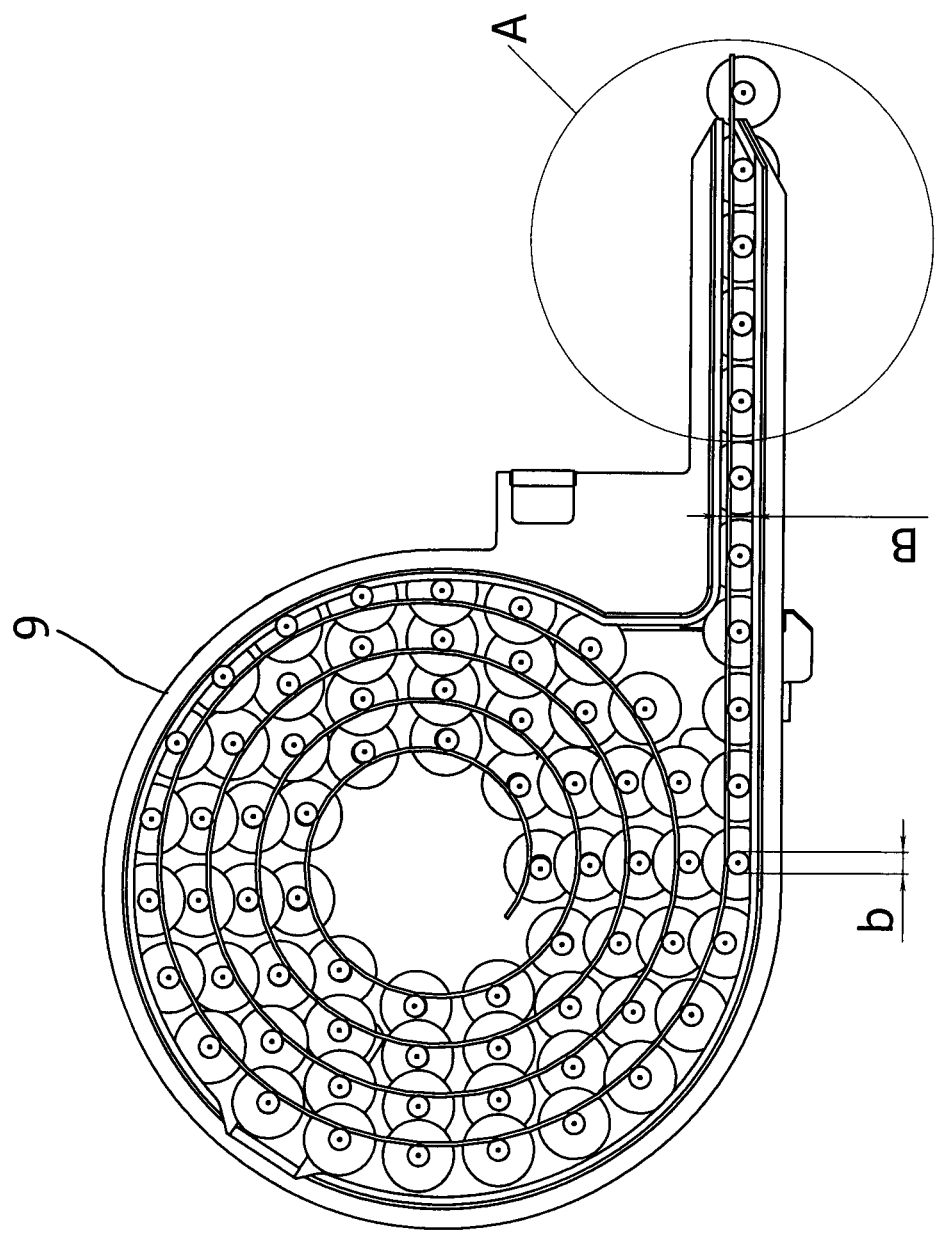
FIG. 6 is a view of the roll illustrated in FIG. 3 seen straight from beneath.

With reference to FIGS. 3-6, these figures illustrate the nail roll 7 provided with transport safety device 8 according to the present invention. The transport safety device is manufactured from a substantially configurationally stable material and may be made from plastic material, metallic material or other material possessing the property of being substantially configurationally stable. As is apparent from the figures, the safety device displays an annular ring 9 which surrounds the outer turn of the nail roll in the region beneath the nail heads 3, which prevents the nail roll from being unrolled when the transport safety device is fitted to the nail roll. On the ring 9, there are disposed rods 10 which extend in a direction in towards the centre 11 of the nail roll closely adjacent the upper side 12 of the heads. In FIG. 5, the double arrow U shows the plane of extent of the nail roll. In that the nail roll is rolled up so that the heads in one winding turn partly cover the heads in the immediately external turn, the nail roll is prevented from falling apart in that direction which is marked by the arrow N in FIG. 5, which is transversely of the plane of extent of the roll. As a result of the rod 10, the roll is prevented from falling apart in that direction which is marked by the arrow F in FIG. 5. Thus, the ring 9 and the rod 10 ensure that the roll 7 maintains its form until such time as it is to be fitted in the intended tool. The figures show two rods 10 with interjacent spacing. The rods may be one or more in number and the number selected depends upon how stable the roll is in that direction which is transverse of the plane of extent U. With reference to FIGS. 4 and 6, it will be apparent therefrom that a discharge device 13 is connected to the ring 9 and comprises a first and a second elongate rail 14 and 15, respectively, which extend out from the ring and between them form a channel 16. It will further be apparent from the figures that the channel 16 is in communication with the ring 9 in such a manner that the elongate band 6 may be discharged out through the channel 16. The channel 16 has a width B which is marginally larger than the width b of the nail shaft. This entails that, when the band 6 is discharged out through the channel, it will be ensured that a discharged nail is guided so that it always arrives in a correctly oriented position when departing from the channel.

Figure 7:
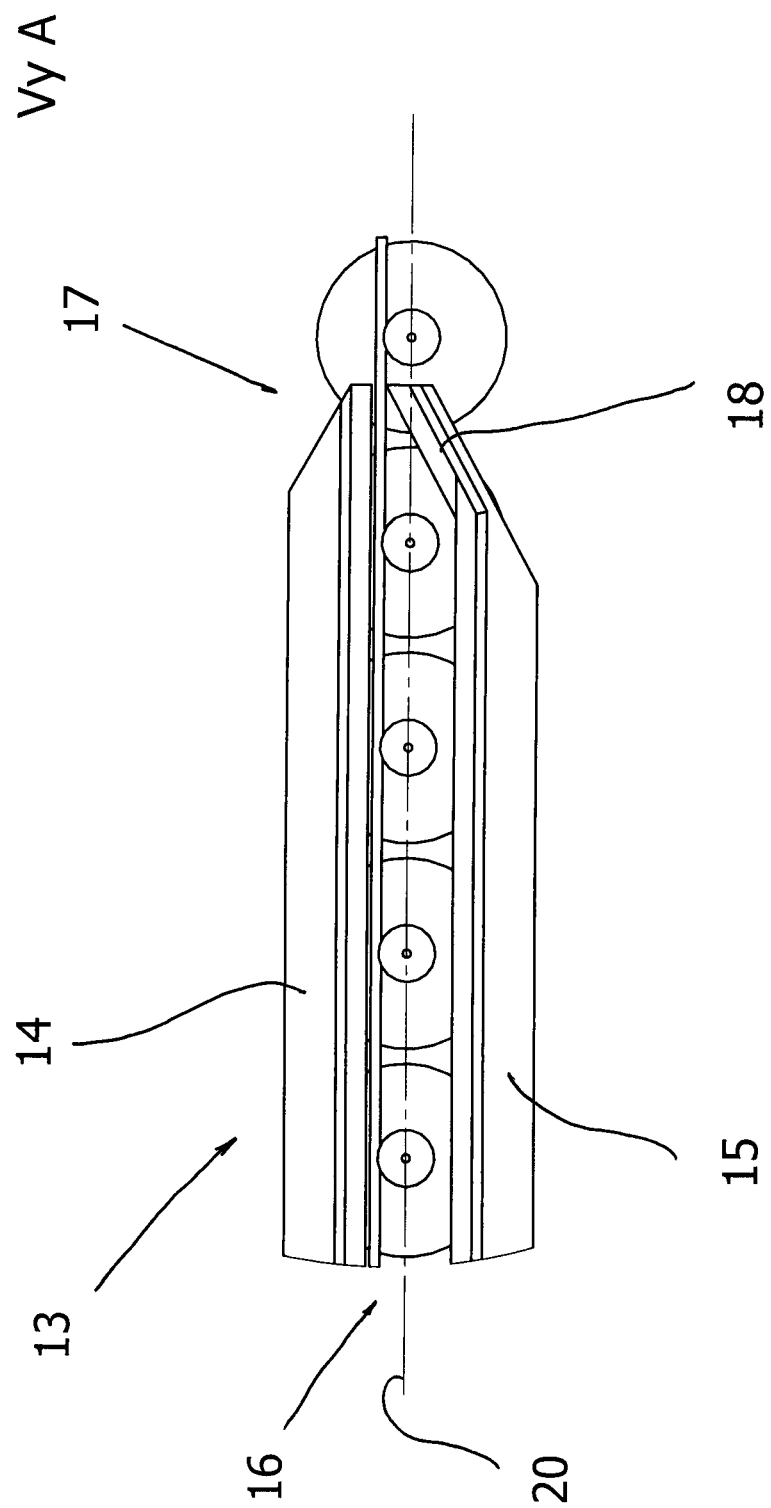
FIG. 7 is a view, on a larger scale, of parts essential to the present invention taken from the circle A in FIG. 6.

With reference to FIG. 7, this figure shows in detail the discharge device 13 consisting of the parts 14 and 15. A part of the nail band 6 is also apparent from the figure. It will further be apparent that, in the discharge mouth 17 of the channel, there is disposed a device 18 which extends in towards and past the centreline 19 of the channel, the centreline being shown by the ghosted line 20. This device functions such that it is lightly yieldable and permits a nail to be discharged out from the channel and past the device 18, but prevents a discharged nail from being passed into the channel through the outlet mouth. Thus, the device functions as a reverse lock which ensures that, when the nail roll is fitted in the nail driver tool, there is no risk that a nail for driving is not in place advanced to the driving area.

Figure 8:
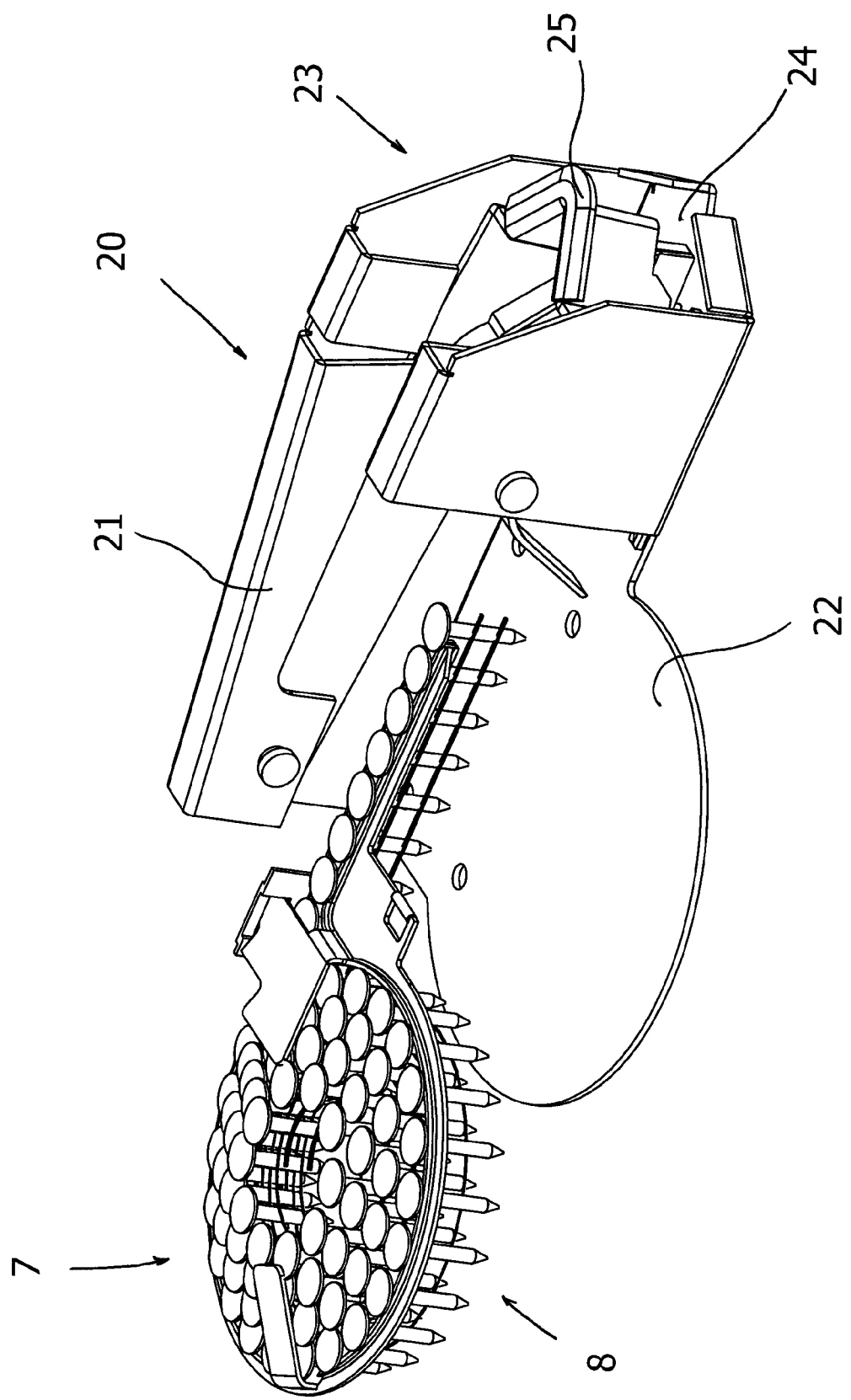

With reference to FIGS. 8 and 9, these figures illustrate a nail roll 7 provided with a transport safety device 8 according to the present invention, as well as a driver tool 20 which is shown in a highly stripped-down version. In FIG. 8, the nail roll is located in a position from which it is to be fitted to the driver tool and in FIG. 9, it is fitted to the driver tool. The tool comprises a handle portion 21 and a surface 22 for supporting the nail roll. Further, the tool includes a drive mechanism 23 which has a drive area 24 in which a drive head 25 is positioned. As will be apparent most clearly from FIG. 8, the front nail of the nail roll is located in a position in which it is discharged outside the discharge channel 13. In this position, the nail, when the roll is mounted to the tool 20, see FIG. 9, is in a position in which it is located straight beneath the drive head 25. When the drive head 25, with the aid of an impact device such as a hammer or the like, is moved in that direction which is illustrated by the arrow P, the drive head will drive the nail into the substrate on which the tool is placed. When this driving action takes place, the nail 1 is separated from the connecting band 5. Since these parts are not of importance to the invention in question here, they are not shown on the Drawings and will not be described further in the present application. When a nail has been driven out of the tool, advancement of the nail band takes place such that a new nail arrives in the drive area. This advancement takes place using means which are located in the tool, and since these means are not of importance to the invention in question here, they are not disclosed in any other manner than that their presence is merely stated. In that the transport safety device includes discharge channel and reverse locking arrangement, the driver tool may be manufactured with few parts which, moreover, do not require accurate manufacture, and so the driver tool will be economical in manufacture. The driver tool is illustrated in the figures as an extremely simple device. However, this device may consist of a nail gun or other comparable device. Naturally, the present invention is not restricted to the foregoing description, but is restricted only by the scope of the appended Claims.

What is claimed is:

1. A transport safety device for a nail coil or roll, the roll consisting of nails comprising head and shank, which, by connecting means, are interconnected to one another longitudinal side by longitudinal side, with the heads oriented in one and the same direction, so as to form an elongate band rolled up to roll form in which form the heads in one winding turn partly cover the heads in the immediately external turn, intended to be fitted to a nail driver tool, where the transport safety device displays a ring which surrounds the outermost turn of the nail roll in the region below the heads of the nails, characterised in that the surrounding ring consists of a configurationally stable material which displays means extending in towards the centre of the roll closely adjacent the upper side of the nail heads, and that the ring and said means prevent the roll from falling apart.

2. The transport safety device as claimed in claim 1, characterised in that said means comprises one or more rods positioned along the ring with interjacent spacing.

3. The transport safety device as claimed in claim 1, characterised in that it includes a discharge channel in communication with the surrounding ring through which the nail band is discharged from the nail roll.

4. The transport safety device as claimed in claim 3, characterised in that the discharge channel includes a first and a second elongate rail, respectively, which between them form a channel.

5. The transport safety device as claimed in claim 3, characterised in that the discharge channel includes a reverse lock.

6. The transport safety device as claimed in claim 4, characterised in that the discharge channel includes a reverse lock.

* * * * *